United States Patent [19]
Kondo et al.

[11] 3,895,955

[45] July 22, 1975

[54] PROCESS FOR BURNING CEMENT CLINKER

[75] Inventors: Marekata Kondo, Yono; Seiwa Fukuda, Kawagoe; Toyohiko Yamamoto, Omiya, all of Japan

[73] Assignee: Mitsubishi Mining & Cement Company, Ltd., Tokyo, Japan

[22] Filed: Aug. 22, 1973

[21] Appl. No.: 390,400

[30] Foreign Application Priority Data
Aug. 31, 1972  Japan.............................. 47-86610

[52] U.S. Cl. .............................................. 106/100
[51] Int. Cl.² .......................................... C04B 7/36
[58] Field of Search....................... 106/100; 432/15

[56] References Cited
UNITED STATES PATENTS

| | | | |
|---|---|---|---|
| 2,776,132 | 1/1957 | Pyzel................................ | 106/100 |
| 3,091,443 | 5/1963 | Herz et al. ........................ | 106/100 |
| 3,139,463 | 6/1964 | Wuhrer............................... | 106/100 |
| 3,212,764 | 10/1965 | Muller et al. ...................... | 106/100 |
| 3,498,594 | 3/1970 | Rikhof............................... | 106/100 |
| 3,703,275 | 11/1972 | Sylvest.............................. | 106/100 |
| 3,784,389 | 1/1974 | Hastrup............................. | 106/100 |

*Primary Examiner*—J. Poer
*Attorney, Agent, or Firm*—Edward J. Brenner

[57] ABSTRACT

A new process for burning cement clinker consisting of a rotary kiln, a raw material suspension preheater comprising multistage cyclone heat exchangers, and a fluidized calciner having a separate heat source is provided. This process improves the all-over decarbonizing rate of raw materials fed into the rotary kiln remarkably by extracting a part of the raw materials from at least one of the multistage cyclone heat exchangers of the suspension preheater and introducing it into the fluidized calciner so as to have it calcined. This process can increase the rotary kiln capacity extremely as compared with that of the conventional suspension preheater system as well as to enable the rotary kiln to operate continuously and stably for a long period.

2 Claims, 4 Drawing Figures

PROCESS FOR BURNING CEMENT CLINKER

BACKGROUND OF THE INVENTION

This invention relates to a process for burning cement clinker consisting of a rotary kiln, a raw material suspension preheater and a calciner with a fluidized bed having a separate heat source (said calciner is referred to hereinafter as "fluidized calciner").

In the conventional process for burning cement clinker consisting of a rotary kiln and a raw material suspension preheater (said process is referred to hereinafter as "conventional burning process"), it is well known that a large-size rotary kiln, in spite of its purpose of improving productivity, can not avoid an increase of heat load in the high temperature sintering zone due to the large diameter thereof with the results of a reduced operation period and increased refractory material requirements followed by a serious economical damage due to repair costs and a decreased production. This makes it very difficult to make a rotary kiln large-sized.

On the other hand, a process for burning cement clinker disclosed in Japanese Pat. Publication No. 30058/1968, which contains a fluidized calciner equipped between a rotary kiln and a raw material suspension preheater and having a separate heat source (said process is referred to hereinafter as "known burning process"), comprises substantially a step wherein the whole quantity of the raw material discharged from the lowest stage cyclone heat exchanger of the suspension preheater is introduced into the fluidized calciner, a step wherein the raw material calcined is discharged from the fluidized calciner to be introduced into the rotary kiln and a step wherein the whole quantity of the fluidized calciner waste gas is mixed with the rotary kiln waste gas in the smoke chamber directly connected with the rotary kiln to be introduced into the suspension preheater. This process increases a specific capacity of the rotary kiln remarkably and makes the temperature of the gas introduced into the suspension preheater to be kept at a temperature suitable for the operation of the suspension preheater, which is below melting temperatures of raw materials and intermediate compounds thereof.

SUMMARY OF THE INVENTION

A primary object of this invention is to provide a process for burning cement clinker which improves the allover decarbonizing rate of raw materials fed into a rotary kiln remarkably.

Another object of this invention is to provide a process for burning cement clinker which makes fuel requirements in a rotary kiln reduced.

A further object of this invention is to provide a process for burning cement clinker which enables a rotary kiln to operate continuously and stably for a long period.

A still further object of this invention is to provide a process for burning cement clinker which increases a rotary kiln production capacity extremely as compared with that of the conventional suspension preheater system.

According to this invention, there is provided a process for burning cement clinker which consists of a rotary kiln, a raw material feeder, a raw material suspension preheater comprising multistage cyclone heat exchangers and a fluidized calciner having a separate heat source, comprising a step wherein a part of raw materials is extracted from the raw material feeder or from at least one of the multistage cyclone heat exchangers to be introduced into the fluidized calciner and a step wherein the fluidized calciner waste gas is introduced into the gas inlet of the lowest stage cyclone heat exchanger in the case of discharging the raw material calcined from the fluidized calciner by overflowing or by carrying over by the fluidized bed waste gas.

According to this invention, there is further provided a process for burning cement clinker which consists of a rotary kiln, a raw material feeder, a raw material suspension preheater comprising multistage cyclone heat exchangers and a fluidized calciner having a separate heat source, comprising a step wherein a part of raw materials is extracted from the raw material feeder or from at least one of the multistage cyclone heat exchangers to be introduced into the fluidized calciner and a step wherein the fluidized calciner waste gas is introduced into the gas inlet of at least one of the multicyclone heat exchangers of the suspension preheater in the case of discharging the raw material calcined from the fluidized calciner by overflowing or by carrying over by the fluidized bed waste gas followed by separation of the raw material from the accompanying waste gas by use of a cyclone.

The features of this invention reside in a way of connection between positions of extracting a part of raw materials from the multistage cyclone heat exchangers of the suspension preheater and positions of introducing the fluidized calciner waste gas into the suspension preheater.

These and other objects of this invention will be readily appreciated by reference to the following detailed description when considered in connection with the accompanying drawing.

DETAILED DESCRIPTION OF THE INVENTION

Figure 1:
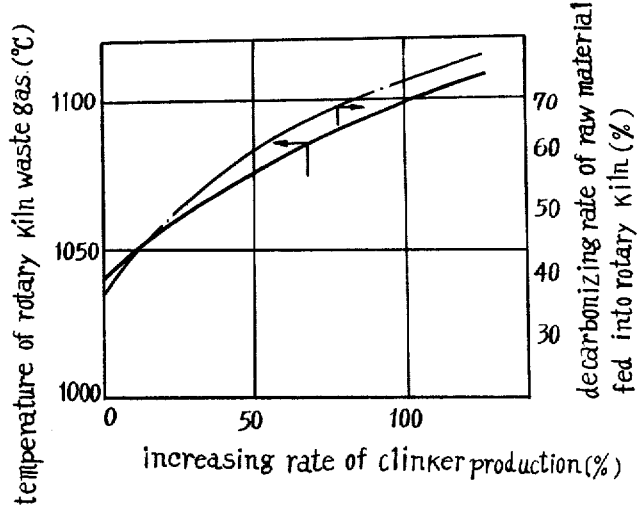
FIG. 1 is a graph showing relations between the increasing rate of clinker production plotted as abscissa and the temperature of the rotary kiln waste gas as well as the decarbonizing rate of the raw materials fed into the rotary kiln plotted as ordinates.

There will be in detail described the research on which this invention is based.

The subject of this invention is, as described hereinabove, a new process for burning cement clinker which improves the allover decarbonizing rate of raw materials fed into the rotary kiln by extracting a part of raw materials from the raw material suspension preheater and introducing it into the fluidized calciner having a separate heat source so as to have it calcined. Hence the research relates to positions of partially extracting raw materials from the suspension preheater and positions of introducing the fluidized calciner waste gas into the suspension preheater.

1. First of all, the positions of partially extracting raw materials from the suspension preheater will be described.

In this case, to simplify the conditions, the whole quantity of the fluidized calciner waste gas shall be induced into the smoke chamber in which said waste gas is mixed with the rotary kiln waste gas to be introduced into the gas inlet of the lowest stage (said stage is referred to hereinafter as "the first stage") cyclone heat-exchanger of the suspension preheater.

1. First, the case in which a part of the raw material is extracted from the raw material discharging chute of the first stage cyclone of the suspension preheater is explained.

As in the case in which the whole quantity of the raw material calcined in the fluidized calciner is discharged accompanied by said calciner waste gas to be circulated into the first stage cyclone as well as in the case in which the raw material calcined in the fluidized calciner is directly introduced into the rotary kiln by overflowing or by carrying over by the fluidized calciner waste gas followed by a separation of the raw material from the accompanying waste gas by use of an exclusive separation cyclone, the raw material is in an almost completely calcined state, there is almost no heat absorption due to the raw material circulated in said cyclone.

On the other hand, as the specific heat consumption of the whole burning equipment system is kept at almost definite level, enthalpy per unit weight of the raw material fed into the suspension preheater, which is brought by the rotary kiln waste gas and the fluidized calciner waste gas introduced together into the first stage cyclone, is also kept definitely. Accordingly, in this case, the conditions for heat exchange between the gas and the raw material in the first stage cyclone and also in the other stage cyclones of the suspension preheater are almost definite, independently of the amount of the raw material partially extracted, that is, of the degree of supplementary calcination by the fluidized calciner, consequently there occurs no restriction due to this point. The restriction occurs when, in the case in which the whole quantity of the raw material calcined in the fluidized calciner is discharged accompanied by the calciner waste gas to be circulated into the first stage cyclone, the amount of the raw material circulated is too much. Namely, in this case in which in addition to the raw material originally fed into the suspension preheater, said raw material circulated is also introduced into the first stage cyclone, when the amount of said raw material circulated is too much, there occur a decrease in heat-exchange efficiency due to a bad dispersion of the raw materials in said cyclone, a reduction in separation efficiency thereof and adhesion of the raw materials to the respective inner parts thereof and the smoke ducts in front and in the rear, etc., consequently the operation becomes difficult.

According to the results of the operation research under various conditions, it was confirmed that when an increasing rate of cement clinker production capacity per unit time brought out by supplementary calcination by the fluidized calciner is about 100%, the amount of the raw material circulated reaches the limit.

2. Next, the case in which a part of the raw material is extracted from the raw material discharge chute of the second stage cyclone of the suspension preheater is explained.

In this case, the conditions of heat-exchange between the gas and the raw material in the first stage cyclone are different from those in the case (1) or in the conventional burning process.

In this case, as the raw material is partially extracted from the suspension preheater just before its introduction into the first stage cyclone and is calcined almost completely in the fluidized calciner, the object of heat-exchanging in the first stage cyclone is only the raw material not extracted from the raw material discharge chute of the second stage cyclone to be introduced into the fluidized calciner, in spite of the manner of discharging the raw material calcined from the fluidized calciner.

Therefore, enthalpy of the whole hot gas introduced into the first stage cyclone per unit weight of the raw material which is the object of heat-exchanging in the first stage cyclone increases as the amount of the raw material partially extracted to be introduced into the fluidized calciner increases. Under the ordinalry operation conditions of the conventional burning process the temperature of the rotary kiln waste gas introduced into the first stage cyclone is about 1,000°–1,100°C, therefore, the decarbonization reactions of carbonate salts, accompanying a large quantity of heat-absorption of 714kcal/kg CaO, proceed very rapidly in the first stage cyclone and consequently the temperature of the raw material to be calcined and that of said waste gas in the first stage cyclone equilibrate with a temperature of 820°–830°C, that is, a decarbonization equilibrium temperature governed by the partial pressure of $CO_2$ in the atmosphere and then the real decarbonizing rate of the raw material calcined (the decarbonizing rate of the case in which no circulated raw material from the rotary kiln is contained is generally 35–40%.

According to the results of the research on which this invention is based, it was confirmed that the increase within a certain limit of enthalpy of the hot gas introduced into the first stage cyclone per unit weight of the raw material for heat-exchange improves alone the decarbonizing rate of the raw material and brings out no rising of the temperature of said cyclone waste gas above the decarbonization equilibrium temperature, that is, no decrease of the heat-exchange efficiency of the first stage cyclone.

This is due to the rapid and extremely endothermic decarbonization reactions of residual carbonate salts of the raw material calcined. Therefore, when enthalpy of the hot gas introduced into the first stage cyclone to take part favorably in heat-exchange therein per unit weight of the raw materials reaches above a certain limit, that is, in the case of this research, when the decarbonizing rate of the raw material discharged from the first stage cyclone is over 70%, the heat-exchange efficiency of the whole raw material preheater including the first stage cyclone begins to fall. This limit, in other words, corresponds to a case in which an increasing rate of cement clinker production capacity per unit time brought out by supplementary calcining by the fluidized calciner is within about 80%.

3. Further, the case in which a part of the raw materials is extracted from the raw material discharge chute of the third stage cyclone of the raw material preheater is explained. In this case in which a part of the raw material is extracted from the raw material preheater into the fluidized calciner to be calcined just before its introduction into the second stage cyclone, only the remaining part of the raw material not extracted is the object of heat-exchanging in the second stage cyclone. Therefore, enthalpy of the hot gas introduced into said second stage cyclone per unit weight of the raw material increases as the ratio of the amount of the raw material partially extracted to be introduced into the fluidized calciner increases. Under the ordinary operation conditions of the conventional burning process, the hot gas introduced into the second stage cyclone, the temperature thereof at the outlet of the first stage cyclone already approximating to a decarbonization equilibrium temperature of the raw material, has almost no more raw material decarbonizing ability in the second stage cyclone. In the heat-exchange between such a hot gas and the raw material, there occurs no more extremely endothermic decarbonization reaction of the raw material, therefore the increase in enthalpy of the hot gas introduced into said cyclone per unit weight of the raw material is liable to be linked to the decrease of heat-exchange efficiency of said cyclone. In the case of this research, when the increasing rate of cement clinker production capacity per unit time brought out by supplementary calcination by the fluidized calciner is over 30%, the heat-exchanger efficiency of the whole raw material preheater including the second stage cyclone begins to fall.

4. Still further, in the case in which a part of the raw materials is extracted from any one of the other stage cyclones above the third stage cyclone, such a getting worse of the heat-exchange conditions as above mentioned spreads also over the second stage cyclone, the third stage cyclone and other parts of the suspension preheater, therefore, the increasing rate of cement clinker production capacity per unit time brought out by supplementary calcination by the fluidized calciner which is allowable on the premise of making the all-over heat-exchange efficiency of the suspension preheater not to be decreased, becomes smaller successively.

In the above, the cases in which the position of partially extracting the raw material from the suspension preheater is one place, have been described. This invention, however, is not limited to these cases.

II. Secondly, the positions of introducing the fluidized calciner waste gas into the raw material preheater will be described.

1. First, the case of special operation in which the fluidized calciner waste gas is favorably induced into the gas inlet of the first stage cyclone of the suspension preheater is explained. In the conventional burning process, the gas introduced from the rotary kiln into the suspension preheater is, as is well-known, generally kept below a certain limited temperature for prevention of possible adhesion and blocking in the lowest stage conduit or the lowest stage cyclone of the raw materials or intermediate compounds thereof circulated from the rotary kiln, and for example, said limited temperature is preferably a temperature below 1074°C, that is a melting point of $K_2SO_4$ which is known to be circulated in large quantity between the rotary kiln and the suspension preheater.

In the known burning process disclosed in Japanese Pat. Publication No. 30058/1968, this object is achieved by mixing rapidly the high temperature rotary kiln waste gas, before its introduction into the raw material preheater, with the relatively low temperature (850°–900°C) fluidized calciner waste gas in the smoke chamber.

According to the results of the operation research on which this invention is based, it was confirmed from FIG. 1 that in the case in which the increasing rate of cement clinker production capacity per unit time brought out by supplementary calcination by the fluidized calciner is below 50%, the all-over decarbonizing rate of the raw material fed into the rotary kiln is about 60% and the remaining 40% thereof is achieved by decarbonization in the rotary kiln, therefore the gas introduced into the suspension preheater can be maintained at a safe temperature suitable for the operation of the suspension preheater, that is, a temperature below 1,074°C, even though not mixed with the relatively low temperature fluidized calciner waste gas.

Consequently, in the case in which the increasing rate of clinker production capacity brought out by the fluidized calciner is below 50%, it is possible to introduce said calciner waste gas directly into the gas inlet of the first stage cyclone of the suspension preheater. Such a way of connecting the fluidized calciner waste gas with the suspension preheater is advantageous in that a high induction pressure for conveying the raw materials can be easily obtained, especially in the case in which the whole quantity of the raw material calcined of the fluidized calciner is discharged accompanied by the fluidized calciner waste gas.

Further, under the ordinary operation conditions of the conventional burning process, a static pressure difference between the smoke chamber and the gas inlet of the first stage cyclone of the suspension preheater is generally 50–100mmAq.

2. Next, the case of special operation, in which the fluidized calciner waste gas is favorably induced to the gas inlet of the second stage cyclone of the suspension preheater is explained.

Now it is previously described that a case in which such a way of connection as described hereinabove is practicable is limited to a case in which the raw material calcined in the fluidized calciner is discharged from said calciner by overflowing, or a case in which the whole quantity of the raw material calcined in said calciner is discharged accompanied by the fluidized calciner waste gas and then is separated from said accompanying waste gas by using an exclusive cyclone specially equipped.

Figure 2:
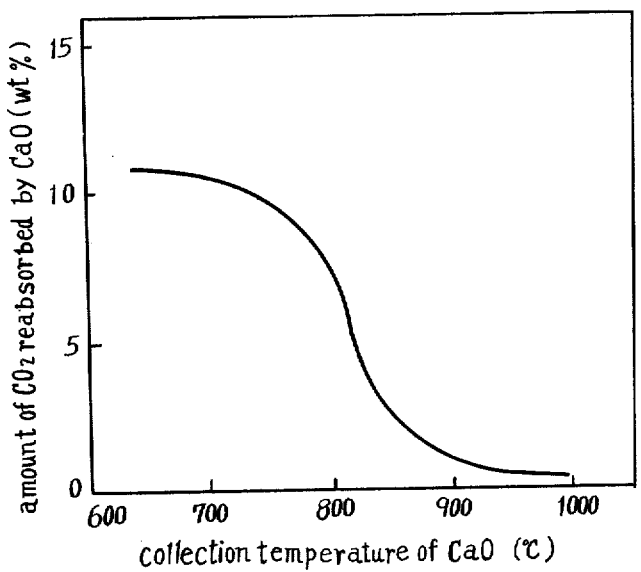
FIG. 2 is a graph showing a relation between the collection temperature of CaO powder plotted as abscissa and the amount of $CO_2$ reabsorbed by said CaO powder plotted as ordinate under the conditions of $CO_2$ partial pressure of 225mmHg, decarbonization equilibrium temperature of 820°C and heating temperature before collection of 1,000°C.

It is well-known that such powders as ordinary cement raw material powders are very easily decarbonizable in the atmosphere above a decarbonization equilibrium temperature. On the contrary, it was experimentally confirmed that when the raw material calcined is cooled down in the atmosphere containing $CO_2$ gas from the high temperature side to the low temperature side across the decarbonization equilibrium temperature governed by the partial pressure of said $CO_2$, the reabsorption reaction of $CO_2$ gas ($CaO + CO_2$ $CaCO_3$) proceeds very rapidly, as FIG. 2 shows.

On the other hand, the gas introduced into the second stage cyclone of the suspension preheater has almost no more raw material decarbonizing ability as described hereinabove, therefore the average temperature in said cyclone is considerably lower than the decarbonization temperature of the raw material and the concentration of $CO_2$ gas in such an atmosphere is generally about 20 volume percent. When the raw material almost completely calcined in the fluidized calciner is introduced into said atmosphere, the reabsorption reaction of $CO_2$ gas proceeds rapidly as described hereinabove, resulting in a decrease in the all-over decarbonizing rate of the raw material and a circulation of heat generated by the reabsorption reaction up to the upper parts of the suspension preheater followed by the remarkable decrease of heat-exchange efficiency of the whole suspension preheater.

For the above reason, a case in which the fluidized calciner waste gas can be introduced into the gas inlet of the second stage cyclone of the suspension preheater is limited to a case in which said waste gas contains almost no raw material calcined, that is, a case in which the raw material calcined in the fluidized calciner is discharged from said calciner by overflowing or a case in which the whole quantity of the raw material calcined in said calciner is discharged accompanied by the fluidized calciner waste gas and then is separated from said waste gas by using an exclusive cyclone specially equipped.

Now, the case of special operation in which the fluidized calciner waste gas can be favorably induced into the gas inlet of the second stage cyclone of the suspension preheater is a case in which the calcining temperature of said calciner is slightly higher than the decarbonization equilibrium temperature of the raw material. According to the results of this research, it was confirmed that when the average residence time of the raw material in the fluidized bed is above 2 minutes, a sufficient decarbonizing rate can be obtained at the calcining temperature 10°-20°C higher than the decarbonization equilibrium temperature.

It is generally known that under the ordinary operation conditions of the fluidized calciner, the operation conditions including such a average residence time as described hereinabove can easily be maintained owing to a uniformity and controllability of the fluidized bed temperature. Furthermore, it was confirmed that according to such an operation, a quantity of sensible heat carried away by the calciner waste gas is the smallest and the calcination efficiency becomes the largest. On the other hand, as the temperature of said calciner waste gas is almost the same as the calcining temperature, that is, 10°-∞°C higher than the decarbonization equilibrium temperature, said waste gas has almost no more raw material decarbonizing ability. Therefore, introduction of such a low temperature gas into the first stage cyclone of the suspension preheater makes the average temperature of the gas in said cyclone, that is, an effective temperature difference between the hot gas and the raw material lowered, thus decreasing the heat-exchange efficiency. Accordingly, it was confirmed that in such a case, it is favorable to introduce the fluidized bed waste gas into the gas inlet of the second stage cyclone of the suspension preheater, carry out heat-exchange between the relatively high temperature rotary kiln waste gas and the raw material in the first stage cyclone and practise heat recovery from said rotary kiln waste gas and the fluidized calciner waste gas in the cyclones following the second stage cyclone. Further, such a way of connection is advantageous in that in the case in which the whole quantity of the raw material calcined in the fluidized calciner is discharged accompanied by said calciner waste gas, a high induced pressure can be easily obtained by equipping an exclusive cyclone for separating the raw material from said waste gas. And under the ordinary operation conditions of the conventional burning process, a static pressure at the gas inlet of the second stage cyclone is generally $-200$ – $-250mmAq$.

3. Further, it is posible to introduce the fluidized calciner waste gas into the gas inlet of any one of other cyclones above the second stage cyclone. In such cases, however, the increasing rate of cement clinker production capacity is naturally restrained at relatively low level.

In the above, the cases in which the position of introducing the fluidized cyclone waste gas into the raw material preheater is onee place, have been described. This invention, however is not limited to these cases.

According to the results of the research on which this invention is based, it was verified that a process for burning cement clinker of this invention comprising the way of connection between a fluidized calciner and a suspension preheater can increase remarkably a rotary kiln capacity, as compared with the conventional burning process as well as to enable the rotary kiln to operate continuously and stably for a long period.

This invention will now be illustrated by the following examples. of course, this invention shall not be limited to the following examples.

EXAMPLE 1

Figure 3:
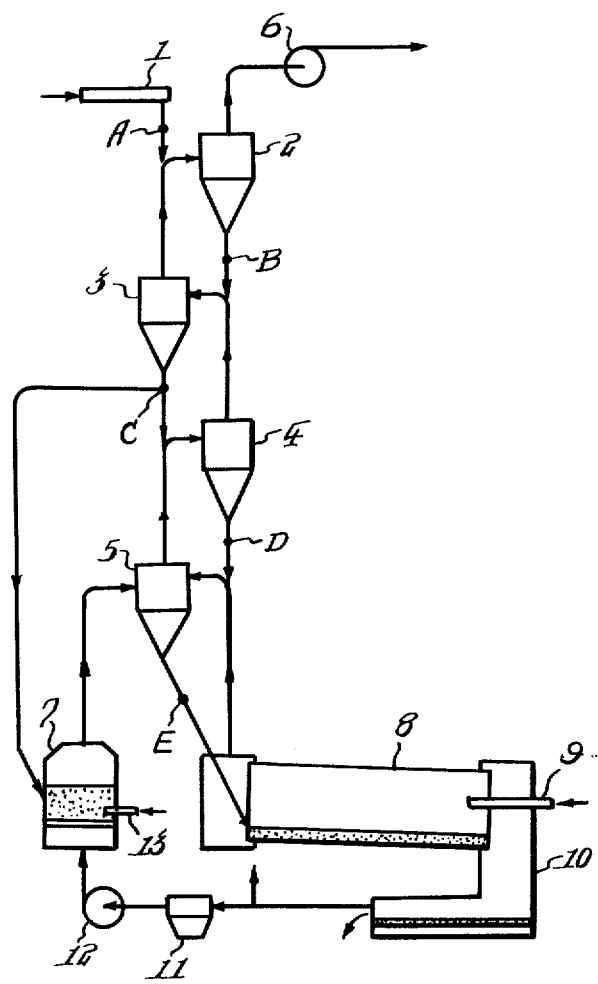
FIG. 3 is an arrangement drawing of a cement clinker burning equippment used for carrying out a preferred embodiment of this invention.

FIG. 3 is an arrangement drawing of a cement clinker burning equippment used for carrying out a preferred embodiment of this invention. This cement clinker burning equipment consists of a raw material feeder, a raw material suspension preheater comprising four stage cyclone heat exchangers, a fluidized calciner having a separate heat source, and a rotary kiln.

In FIG. 3, 1 is the raw material feeder, 2 the fourth stage cyclone heat exchanger, 3 the third stage cyclone heat exchanger, 4 the second stage cyclone heat exchanger, 5 the first cyclone heat exchanger, 6 the induced draft fan, 7 the fluidized calciner, 8 the rotary kiln, 9 the rotary kiln burner, 10 the cement clinker cooler, 11 the dust separator, and 12 the blower. A, B, C, D and E are respectively the positions of partially extracting raw materials from the respective raw material outlet of the raw material feeder 1 and the fourth stage 2, the third stage 3, the second stage 4, the first stage 5 of the cyclone heat exchangers.

The raw material fed from the raw material feeder 1 is heat-exchanged with the rotary kiln waste gas and the fluidized calciner waste gas during its passing through the four stage cyclone heat exchangers 2, 3, 4, 5 and finally is introduced into the rotary kiln 8 to be burned into cement clinker. In this Example, a part of the raw material is extracted from C to be introduced inot the fluidized calciner 7. A part of the raw material may also be extracted from any one of A, B, D, E.

The rest of the raw material which is not extracted from C passes through the second stage 4 and first stage 5 cyclone heat exchangers successively and then is introduced into the rotary kiln 8. The raw material extracted partially from C and introduced into the fluidized calciner 7 is calcined therein and the whole quantity of the raw material calcined is discharged accompanied by said calciner waste gas and is induced by negative pressure into the gas inlet of the first stage cyclone heat exchanger 5 wherein it is mixed with said rest of the raw material not extracted from C and then is introduced into the rotary kiln 8 to be burned to cement clinker.

EXAMPLE 2

Figure 4:
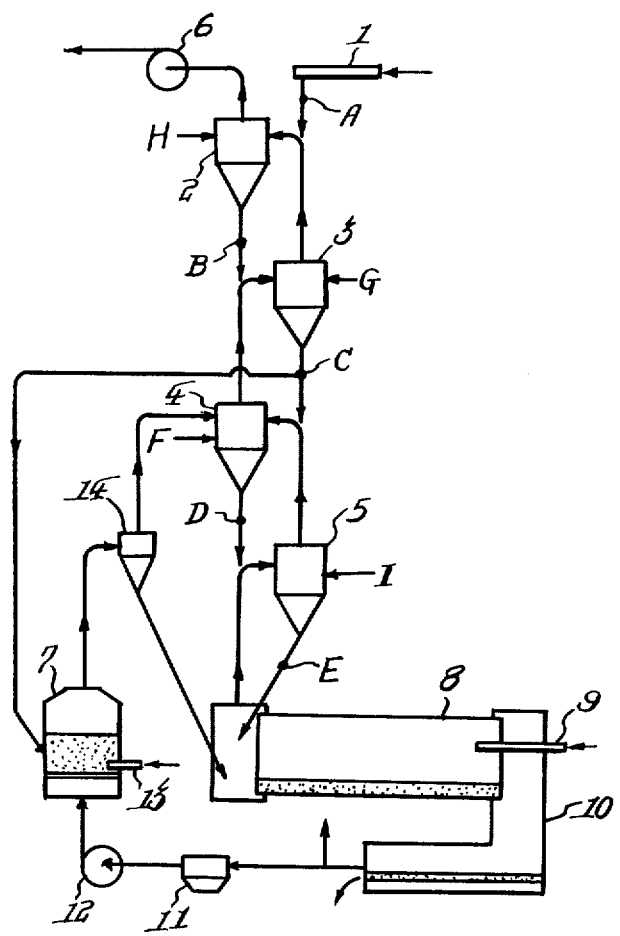
FIG. 4 is an arrangement drawing of a cement clinker burning equippment used for carrying out another preferred embodiment of this invention.

FIG. 4 is an arrangement drawing of a cement clinker burning equipment used for carrying out another preferred embodiment of this invention. The cement clinker burning equipment in this Example consists of the cement clinker burning equipment in Example 1 and an additional separation cyclone for separating the raw material from the accompanying calciner waste gas.

In this Example, the position of introducing the fluidized calciner waste gas from the separation cyclone into the cyclone heat exchangers is different from that in Example 1.

In FIG. 4, 14 is the separation cyclone, I, F, G, H are the positions of introducing the fluidized calciner waste gas from the separation cyclone 14 into the respective gas inlet of the first stage 5, second stage 4, third stage 3 and fourth stage 2 of the cyclone heat exchangers, and the rest, except the above, are the same as in Example 1.

The raw material fed from the raw material feeder 1 is heat-exchanged with the rotary kiln waste gas and the fluidized calciner waste gas during its passing through said four stage cyclone heat exchangers 2, 3, 4, 5, and finally is introduced into the rotary kiln 8 to be burned to cement clinker.

In this Example, as in Example 1, the raw material is extracted partially from C and is introduced into the fluidized calciner 7. The raw material may also be extracted partially from any one of A, B, D, and E. The rest of the raw material not extracted from C passes through the lower stage cyclone heat exchangers successively and then is introduced into the rotary kiln 8. The raw material extracted partially from C and introduced into the fluidized calciner 7 is calcined there in, and then the whole quantity of the raw material calcined is discharged accompanied by the fluidized calciner waste gas to be introduced into the separation cyclone 14 wherein the raw material calcined is separated from the accompanying waste gas.

In this Example, the waste gas is induced by negative pressure into F (said waste gas may also be induced into any one of G, H, I), while the raw material separated from the waste gas by the separation cyclone 14 is mixed with the rest of the raw material not extracted from C, and then is introduced into the rotary kiln 8 to be burned to cement clinker.

What is claimed is:

1. In a process for burning cement clinker which comprises feeding cement raw material from a feeder to a multi-stage preheating zone, heat exchanging successively said cement raw material with a combustion gas from a combustion zone through said multi-stage preheating zone, burning to cement clinker in a non-fluidized state the heat exchanged cement raw material in said combustion zone with the aid of fuel and cooling said cement clinker, the improvement with comprises introducing a part of said cement raw material heat exchanged from said multi-stage preheating zone into a fluidized calcining zone having a separate heat source where said part thereof is calcined in a fluidzied bed, introducing a waste gas from said calcining zone which entrains the calcined cement raw material to a final stage of said multi-stage preheating zone where the calcined cement raw material is separated from said waste gas and brought to be mixed with another part of the heat exchanged cement raw material which has not been introduced into said fluidized calcining zone, and then feeding the calcined and the heat exchanged cement raw materials to said combustion zone to produce a burned cement clinker.

2. A process for burning cement clinker claimed in claim 1, wherein a part of said cement raw material from said feeder is directly introduced into said fluidized calcining zone.

* * * * *